(12) United States Patent
Chen

(10) Patent No.: US 9,102,825 B2
(45) Date of Patent: Aug. 11, 2015

(54) DYNAMICALLY CROSSLINKED THERMOPLASTIC MATERIAL PROCESS

(71) Applicant: NIKE, Inc., Beaverton, OR (US)

(72) Inventor: John C. Chen, Hockessin, DE (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/029,136

(22) Filed: Sep. 17, 2013

(65) Prior Publication Data

US 2015/0080517 A1   Mar. 19, 2015

(51) Int. Cl.
| | |
|---|---|
| C08L 23/04 | (2006.01) |
| C08L 23/10 | (2006.01) |
| C08L 33/02 | (2006.01) |
| C08L 9/00 | (2006.01) |
| C08F 8/00 | (2006.01) |
| B29B 7/46 | (2006.01) |
| C08J 3/11 | (2006.01) |
| C08J 3/24 | (2006.01) |

(52) U.S. Cl.
CPC . C08L 33/02 (2013.01); B29B 7/46 (2013.01); C08F 8/00 (2013.01); C08J 3/11 (2013.01); C08J 3/24 (2013.01); C08L 9/00 (2013.01); C08L 2205/02 (2013.01); C08L 2308/00 (2013.01); C08L 2314/02 (2013.01)

(58) Field of Classification Search
CPC ... C08L 23/142; C08L 23/14; C08L 2205/02; C08L 2308/00; C08L 2314/02
USPC .................................................. 525/240, 191
See application file for complete search history.

(56) References Cited

U.S. PATENT DOCUMENTS

| | | | |
|---|---|---|---|
| 3,454,676 | A | 7/1969 | Busse |
| 4,858,924 | A | 8/1989 | Saito et al. |
| 5,185,387 | A | 2/1993 | Klesse et al. |
| 5,407,998 | A | 4/1995 | Horiuchi et al. |
| 5,857,926 | A | 1/1999 | Sullivan et al. |
| 6,096,830 | A | 8/2000 | Takemura et al. |
| 6,114,453 | A | 9/2000 | Irii et al. |
| 6,207,761 | B1 | 3/2001 | Smith et al. |
| 6,290,613 | B1 | 9/2001 | Irii et al. |
| 6,306,049 | B1 | 10/2001 | Rajagopalan |
| 6,802,784 | B2 | 10/2004 | Sullivan et al. |
| 7,148,279 | B2 | 12/2006 | Voorheis et al. |
| 7,381,768 | B2 | 6/2008 | Wiercinski et al. |
| 7,429,220 | B2 | 9/2008 | Kuntimaddi et al. |
| 8,048,949 | B1 | 11/2011 | La Scala et al. |
| 8,178,625 | B2 | 5/2012 | Ellul et al. |
| 2002/0025863 | A1 | 2/2002 | Irii et al. |
| 2002/0032278 | A1 * | 3/2002 | Rajagopalan et al. .......... 525/88 |
| 2002/0086745 | A1 | 7/2002 | Rajagopalan |
| 2002/0173382 | A1 | 11/2002 | Sullivan |
| 2002/0187857 | A1 | 12/2002 | Kuntimaddi et al. |
| 2003/0008975 | A1 | 1/2003 | Takesue et al. |
| 2003/0013549 | A1 | 1/2003 | Rajagopalan et al. |
| 2003/0022733 | A1 | 1/2003 | Sullivan et al. |
| 2003/0158352 | A1 | 8/2003 | Rajagopalan et al. |
| 2003/0191246 | A1 | 10/2003 | Morgan et al. |
| 2003/0216520 | A1 | 11/2003 | Irii et al. |
| 2003/0229183 | A1 | 12/2003 | Voorheis et al. |
| 2004/0048690 | A1 | 3/2004 | Sullivan et al. |
| 2004/0048691 | A1 | 3/2004 | Sullivan et al. |
| 2004/0048692 | A1 | 3/2004 | Sullivan et al. |
| 2004/0132546 | A1 | 7/2004 | Kuntimaddi et al. |
| 2004/0242802 | A1 | 12/2004 | Voorheis et al. |
| 2004/0266556 | A1 | 12/2004 | Sullivan et al. |
| 2004/0266558 | A1 | 12/2004 | Kuntimaddi et al. |
| 2005/0009635 | A1 | 1/2005 | Kuntimaddi et al. |
| 2005/0009636 | A1 | 1/2005 | Kuntimaddi et al. |
| 2005/0085590 | A1 | 4/2005 | Morgan et al. |
| 2005/0187347 | A1 | 8/2005 | Sullivan et al. |
| 2006/0035725 | A1 | 2/2006 | Sullivan et al. |
| 2008/0058478 | A1 | 3/2008 | Kuntimaddi et al. |

(Continued)

FOREIGN PATENT DOCUMENTS

| | | |
|---|---|---|
| CN | 102816282 A | 12/2012 |
| EP | 2380933 A1 | 10/2011 |

(Continued)

OTHER PUBLICATIONS

Written Opinion and International Search Report for PCT/US2014/055915 dated Dec. 4, 2015.

*Primary Examiner* — Nathan M Nutter
(74) *Attorney, Agent, or Firm* — Honigman Miller Schwartz & Cohn LLP; Anna M. Budde; Jonathan P. O'Brien

(57) ABSTRACT

A method for making a thermoplastic material includes: (a) partially crosslinking an elastomer composition at a first crosslinking temperature to form a thermoplastic, partially crosslinked elastomer composition; (b) mixing a thermoplastic polymer composition with the thermoplastic, partially crosslinked elastomer composition and heating the mixture to a second crosslinking temperature higher than the first crosslinking temperature, wherein the thermoplastic polymer composition is liquid at the second crosslinking temperature; and (c) continuously mixing the mixture while further crosslinking the elastomer composition to form a thermoplastic material having a dispersed phase of crosslinked elastomer composition in the thermoplastic polymer composition. The elastomer composition may include an elastomer compounded with a curing agent and optionally additional components. A thermoplastic material resulting from this process may be molded or shaped by any method used for forming thermoplastic materials into articles, such as molding, extrusion, or thermoforming.

20 Claims, 1 Drawing Sheet

(56) References Cited

U.S. PATENT DOCUMENTS

| | | |
|---|---|---|
| 2008/0214735 A1 | 9/2008 | Kuntimaddi et al. |
| 2008/0314493 A1 | 12/2008 | Hara |
| 2009/0011861 A1 | 1/2009 | Kuntimaddi et al. |
| 2010/0167847 A1 | 7/2010 | Tarao et al. |
| 2010/0283000 A1 | 11/2010 | Shimizu et al. |
| 2011/0143863 A1 | 6/2011 | Sullivan et al. |
| 2011/0143864 A1 | 6/2011 | Sullivan et al. |
| 2011/0281984 A1 | 11/2011 | Garois et al. |
| 2013/0095955 A1 | 4/2013 | Higuchi et al. |

FOREIGN PATENT DOCUMENTS

| | | |
|---|---|---|
| GB | 2210047 A | 6/1989 |
| JP | 62057571 | 3/1987 |
| JP | 9108384 | 4/1997 |
| JP | 10230025 | 9/1998 |
| JP | 11137722 | 5/1999 |
| JP | 11137723 | 5/1999 |
| JP | 11181296 | 7/1999 |
| JP | 11192324 | 7/1999 |
| JP | 11302449 | 11/1999 |
| JP | 2000080203 A | 3/2000 |
| JP | 2000245871 A | 9/2000 |
| JP | 2001151981 A | 6/2001 |
| JP | 3294345 B2 | 6/2002 |
| JP | 2003183444 A | 7/2003 |
| JP | 2007209472 A | 8/2007 |
| JP | 4359025 B2 | 11/2009 |
| KR | 2001011007 | 2/2001 |

* cited by examiner

DYNAMICALLY CROSSLINKED THERMOPLASTIC MATERIAL PROCESS

FIELD OF THE INVENTION

The invention concerns processes for making dynamically crosslinked thermoplastic materials, materials made by the processes, and articles made from such materials. In another aspect, the invention concerns articles including sports equipment such as golf balls, athletic footwear, and protective gear made with elastomers.

BACKGROUND

This section provides information helpful in understanding the invention but that is not necessarily prior art.

Articles formed from cured elastomers may have excellent physical properties, such as stability, durability, flexibility, elasticity, and resilience. For example, a core of a golf ball may be formed from a cured elastomer and may be configured to provide the golf ball with specific characteristics, such as compression, spin, velocity, and resilience. As such, golf balls including cores formed from cured elastomers may be optimized for various playing abilities and conditions. One limitation of crosslinked rubbers and other thermoset materials is that they cannot be easily recycled. Scrap thermoset materials generated during production that cannot be recycled increase manufacturing costs. Further, it is desirable that a product be recyclable after the end of its useful life.

Dynamically vulcanized or dynamically crosslinked thermoplastic compositions have been made by melt mixing a thermoplastic resin (e.g., polyethylene or polypropylene) and a rubber, then curing the rubber while mixing to produce dispersed crosslinked rubber domains in a matrix of the thermoplastic resin. The materials that can be made via dynamic crosslinking have been somewhat limited, however, by the ready transference of some components between the rubber and thermoplastic phases during melt mixing.

SUMMARY OF THE DISCLOSURE

This section provides a general summary of the disclosure and may not be comprehensive of its full scope or all of the disclosed features.

A method for making a thermoplastic material includes adding a thermoplastic composition to a partially crosslinked but still processable elastomer and mixing the partially crosslinked elastomer composition and the thermoplastic composition during further crosslinking of the elastomer to form a dynamically crosslinked (also know as dynamically vulcanized) thermoplastic material that includes domains of crosslinked or cured elastomer.

Also disclosed is a method in which an elastomer is partially crosslinked to form a thermoplastic, partially crosslinked elastomer composition, then a thermoplastic polymer composition is mixed with the thermoplastic, partially crosslinked elastomer composition to form a mixture that is continuously mixed while further crosslinking the elastomer composition to form a thermoplastic material having a dispersed phase of crosslinked elastomer composition in the thermoplastic polymer composition. The dispersed phase of crosslinked elastomer is more crosslinked than the thermoplastic, partially crosslinked elastomer composition. An embodiment of the method for making a thermoplastic material includes: (a) partially crosslinking an elastomer composition at a first crosslinking temperature to form a thermoplastic, partially crosslinked elastomer composition; (b) mixing a thermoplastic polymer composition with the thermoplastic, partially crosslinked elastomer composition; (c) heating the mixture to a second crosslinking temperature higher than the first crosslinking temperature, wherein the thermoplastic polymer composition is liquid at the second crosslinking temperature; and (d) continuously mixing the mixture while further crosslinking the elastomer composition to form a thermoplastic material having a dispersed phase of crosslinked or cured elastomer composition in the thermoplastic polymer composition. The elastomer composition may include an elastomer compounded with reactants such as a curing agent or crosslinking agent, catalyst or free radical initiator, or any additional components such as fillers, oils, and additives. Further disclosed is a thermoplastic material resulting from this process, which may be molded or shaped by any method used for forming thermoplastic materials into articles. Such shaping methods may include molding, extrusion, thermoforming, laminating, and combinations of shaping steps and methods. Still further disclosed are the articles made from the thermoplastic material resulting from the process.

Also disclosed is a method for making a thermoplastic material that includes: (a) introducing into an extruder an elastomer composition including an ethylenically unsaturated elastomer polymer and at least a first free radical initiator and a second free radical initiator; (b) in a first zone of the extruder, heating and partially crosslinking the elastomer composition at a first crosslinking temperature to form a thermoplastic, partially crosslinked elastomer composition; (c) introducing into the extruder in a second zone downstream of the first zone a thermoplastic polymer composition; (d) heating the thermoplastic polymer composition and the thermoplastic, partially crosslinked elastomer composition to a second crosslinking temperature higher than the first crosslinking temperature, wherein the thermoplastic polymer composition is liquid at the second crosslinking temperature; and (e) further crosslinking the elastomer composition to form a thermoplastic material having a dispersed phase of the crosslinked elastomer composition in the thermoplastic polymer composition. The thermoplastic material made by the method may be extruded into a tube, sheet, pellets, or other form, which may, optionally, be subject to further forming steps such as molding, thermoforming, and cutting. Also disclosed are articles made from the thermoplastic material.

In certain embodiments of these methods, at least one of the thermoplastic material or the elastomer composition includes a component that is prevented or slowed from transferring to the other of the thermoplastic material or the elastomer composition by the partial crosslinking of the elastomer composition before the elastomer composition is mixed with the thermoplastic material.

In certain embodiments of these methods, the elastomer composition includes an ethylenically unsaturated elastomer polymer and at least a first free radical initiator and a second free radical initiator. In a first relationship between the first and second free radical initiators, the first free radical initiator may have a half-life of from about 0.2 minutes to about 5 minutes at the first crosslinking temperature, and the second free radical initiator may have a half-life of from about 0.2 minutes to about 5 minutes at the second crosslinking temperature, with the second crosslinking temperature being higher than the first crosslinking temperature by at least about 30° C. Instead of or in addition to the first relationship, there may be a second relationship between the first and second initiators such that the first free radical initiator has a one-minute half-life temperature that is at least about 30° C. lower than the second free radical initiator's one-minute half-life temperature, and the first crosslinking temperature may then be from about 20° C. lower to about 20° C. higher than the first one-minute half-life temperature and the second crosslinking temperature may be from about 20° C. lower to about 20° C. higher than the second one-minute half-life temperature.

Also disclosed are embodiments of these methods in which the elastomer composition includes the elastomer, the first free radical initiator, the second free radical initiator, and an α,β-ethylenically unsaturated carboxylic acid or a metal salt of an α,β-ethylenically unsaturated carboxylic acid. In these or other embodiments, the thermoplastic polymer composition may include a metal cation-neutralized copolymer of ethylene, an α,β-ethylenically unsaturated carboxylic acid, and, optionally, at least one further comonomer. optionally, a metal salt of a fatty acid and, optionally, a further thermoplastic resin.

A golf ball may be formed from a dynamically crosslinked thermoplastic material having a dispersed phase of crosslinked elastomer composition prepared using these materials in one of the disclosed processes. The dynamically crosslinked thermoplastic material may be used as a unitary golf ball or used as a component of a multi-layer golf ball, such as a center, a cover, or any intermediate layer between the center and the cover. In multi-layer golf balls, the center and any intermediate layers may be referred to as the core of the golf ball.

The dynamically crosslinked thermoplastic materials formed by these methods and the articles made from them have excellent physical properties, including resilience, thermal properties, toughness, and sound dampening properties. For example, golf balls formed by the methods may have excellent coefficients of restitution, may exhibit excellent durability, and may be formulated to provide a desired spin during flight. This is particularly so when the elastomer composition or the thermoplastic polymer composition includes non-polymeric components. The first step of partially crosslinking the elastomer diminishes or prevents the non-polymeric components from transferring between the elastomer and the thermoplastic polymer phases. In particular, the methods may provide the dynamically crosslinked thermoplastic material with unique viscoelastic properties, a broader distribution of elastomer chain molecular weights between crosslinks, or other beneficial differences as compared to the product that would be obtained by conventional dynamic crosslinking methods using the materials.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. Further, as used herein, the terminology "at least" is equivalent to "greater than or equal to," and the terminology "up to" is equivalent to "less than or equal to."

It should be understood that the description and specific examples are intended for purposes of illustration only and are not intended to limit the scope of the claims.

BRIEF DESCRIPTION OF THE DRAWINGS

The drawings illustrate some aspects of the disclosed technology.

The parts of the figures are not necessarily to scale.

DETAILED DESCRIPTION

A detailed description including exemplary, nonlimiting embodiments follows.

The dynamically crosslinked thermoplastic material may be prepared in a batch process or a continuous process in suitable mixing equipment, such as roll mills, intermeshing rotor mixers, tangential rotor mixers such as Banbury mixers, Brabender mixers, and continuous mixers such as extruders, particularly twin-screw extruders.

Figure 1:
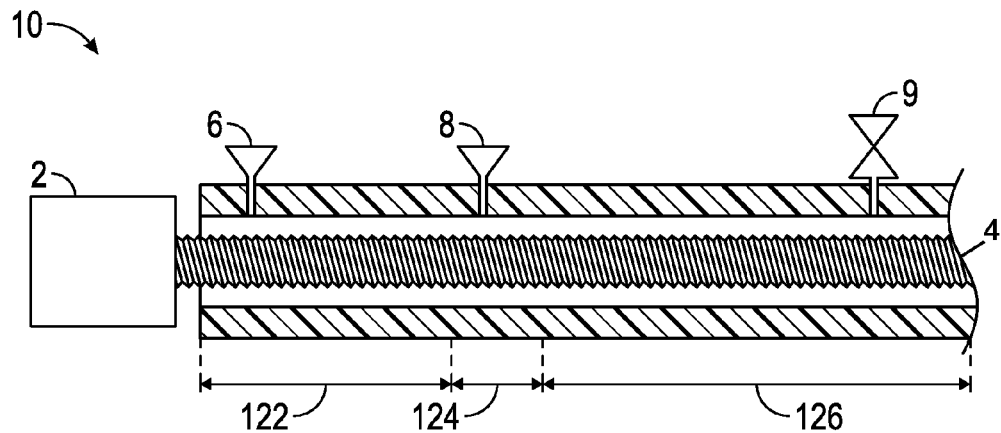
FIG. 1 is a schematic cross-sectional illustration of an extruder used in a disclosed method.

Referring to the Figures, the disclosed method is illustrated with reference to an extruder 10 as shown schematically in FIG. 1. The extruder 10 has a motor 2 to turn a screw 4 inside the extruder 10. Screw 4 may be a single screw or twin screws made of individual elements (not shown) of various sizes and pitches appropriate for mixing or kneading the specific materials used. An elastomer composition is added into the extruder 10 through a port 6. The elastomer composition is partially crosslinked at a first crosslinking temperature in section 122 of extruder 10 to form a thermoplastic, partially crosslinked elastomer composition. A thermoplastic polymer composition is added via port 8 into the extruder 10 and mixed or kneaded with the thermoplastic, partially crosslinked elastomer composition in section 124. The thermoplastic polymer composition may be added as a melt or as appropriately-sized solid pieces, for example chips or pellets, that are melted out in section 124 as they are mixed or kneaded with the thermoplastic, partially crosslinked elastomer composition. The partial crosslinking of the elastomer composition that has taken place before the thermoplastic polymer composition is added prevents or reduces transference of lower molecular weight or non-polymeric components (e.g., crosslinkers, curing agents, initiators, catalysts, monomers, plasticizers, modifiers, additives, colorants, pigments, fillers, and so on) from the elastomer composition to the thermoplastic polymer composition or from the thermoplastic polymer composition to the elastomer composition. Because the elastomer composition is only partially crosslinked and remains thermoplastic, it can be mixed or kneaded with the thermoplastic polymer composition so that, on further curing, the cured elastomer domains are well-dispersed in the thermoplastic polymer matrix.

The addition of the thermoplastic polymer composition may reduce the temperature of the contents of the extruder or mixer to slow or stop the rate of elastomer crosslinking. The mixture of the thermoplastic, partially crosslinked elastomer composition and the thermoplastic polymer composition is heated so that the thermoplastic polymer melts, if solid, and crosslinking continues to form domains of cured elastomer in a matrix of the thermoplastic polymer composition. In other embodiments, the thermoplastic polymer composition may be added as a melt at a temperature close to the first crosslinking temperature such that crosslinking of the elastomer composition may continue to a certain extent, depending upon the amount of the first initiator included, while the thermoplastic polymer composition is being mixed into the thermoplastic, partially crosslinked elastomer composition.

The extent to which the elastomer composition is crosslinked before the thermoplastic polymer composition is mixed with the elastomer composition is controlled so that the elastomer composition remains thermoplastic and can be mixed with the thermoplastic polymer composition. This can be accomplished in various ways, for instance by controlling the amount of time for crosslinking the elastomer before the thermoplastic polymer composition is introduced into the extruder or mixer; by controlling the crosslinking temperature; by causing a temperature reduction at a desired point of crosslinking to stop or slow further crosslinking while the thermoplastic polymer composition is being mixed into the elastomer composition; by limiting the amount of first initiator active at the first crosslinking temperature; or by a combination of these. The amount of time for crosslinking the elastomer before the thermoplastic polymer composition is introduced into an extruder can be controlled by controlling screw speed, by locating port 8 closer to or further from port 6, or by a combination of these. The first crosslinking temperature may be chosen to control the rate of crosslinking, for example by selecting a first crosslinking temperature at which the half-life of the first initiator is relatively long so that the crosslinking reaction is relatively slow. The temperature may also be reduced at a desired point to slow or effectively stop crosslinking while the thermoplastic polymer composition is introduced and mixed with the partially crosslinked (but still thermoplastic) elastomer composition, such as by applying cooling. A decrease in temperature may be brought about by introduction of the thermoplastic polymer composition itself when the thermoplastic polymer composition is at a temperature significantly lower than the first crosslinking temperature. Crosslinking may also be controlled by limiting the amount of the first initiator active at the first crosslinking temperature, then adding the thermoplastic polymer composition and continuing to crosslink the elastomer at a higher, second crosslinking temperature at which a second initiator is active.

The thermoplastic polymer composition is mixed and kneaded with the elastomer composition in section 124. The thermoplastic polymer composition may be added as a liquid (above the melting point or glass transition temperature of the thermoplastic polymer) or may be added as pellets or other small pieces formed of the compounded thermoplastic polymer composition that are of appropriate size for introduction into the extruder or other reactor, for example pellets, chips, or flakes. When added as a solid, the thermoplastic polymer composition is heated to liquefy it in section 124.

The mixture of the thermoplastic polymer composition and the partially crosslinked (but still thermoplastic) elastomer composition is heated, with in section 124 or in an initial part of section 126, to a second crosslinking temperature higher than the first crosslinking temperature while being mixed or kneaded. In section 126, the mixture is mixed or kneaded while the elastomer composition crosslinks at the second crosslinking temperature. As its crosslinking density increases and it becomes cured, the elastomer composition forms a dispersed phase of crosslinked elastomer domains in a matrix of the thermoplastic polymer. The resulting dynamically crosslinked thermoplastic material is extruded at an end of the extruder opposite the motor 2. Vacuum port 9 may be used to remove volatiles, for example water, volatile organic liquids that may have been introduced as solvents with some materials, or crosslinking reaction by-products. The extrudate of dynamically crosslinked thermoplastic material may be shaped by being extruded through a die (not shown). For example, the dynamically crosslinked thermoplastic material may be extruded in the form of strands that are then pelletized, in the form of a tube, or in the form of a sheet. The product dynamically crosslinked thermoplastic may be further shaped or molded by any of the methods known for forming articles from thermoplastic materials.

The first crosslinking step before mixing and kneading of the partially-cured elastomer composition with the thermoplastic polymer composition provides a unique viscoelastic character to the dynamically crosslinked thermoplastic material than can be obtained in the conventional dynamic crosslinking process, particularly when the elastomer or thermoplastic matrix materials contain non-polymeric components. The first crosslinking step prevents or diminishes transference of low molecular weight components from one phase to another. Such low molecular weight components may be, for example, plasticizers, modifiers, and additives.

The process has been illustrated as being carried out in an extruder in a continuous process, but the process may also be carried out using other equipment in either a continuous process or a batch process. When the process is carried out as a batch process, first the elastomer composition is added into the batch mixer, for example a Banbury mixer, and partially crosslinked with mixing or kneading at a first crosslinking temperature before the thermoplastic polymer composition is added. The thermoplastic polymer composition may be added as a melt or may be added as solid pieces, for example pellets, chips, or flakes, and melted while it is being mixed with the partially crosslinked elastomer composition, with additional heating as needed. The partial crosslinking of the elastomer composition prevents or retards transference of non-polymeric components from the elastomer composition to the thermoplastic polymer composition or from the thermoplastic polymer composition to the elastomer composition. As mixing or kneading is continued, and optionally with melting or continuing to melt the thermoplastic polymer composition, the temperature of the mixture is increased to a second crosslinking temperature and the elastomer composition is further crosslinked. As the elastomer composition is mixed with the thermoplastic polymer composition and further crosslinked, it forms dispersed, cured rubber domains in a matrix of the thermoplastic polymer composition.

The process may also be carried out with an initial batch process step to partially crosslink the elastomer composition followed by a continuous process in which the partially crosslinked elastomer composition and the thermoplastic polymer composition are mixed and heated to the second crosslinking temperature where the elastomer composition forms cured elastomer domains in a matrix of the thermoplastic polymer composition.

Elastomer Composition

The elastomer composition includes at least one elastomer, a first free radical initiator, a second free radical initiator, and optionally other components such as monomers or crosslinking agents, colorants, fillers, processing aids, and additives. Individual components may be mixed together in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make the thermosetting elastomer composition. The mixer may blend the components together via a single step or multiple steps, and may mix the components via dispersive mixing or distributive mixing to form the resulting thermosetting elastomer composition. This step is often referred to as "compounding" an elastomer (e.g., a rubber) and the mixture (the thermosetting elastomer composition) may also be called an elastomer compound (e.g., a rubber compound).

A. Elastomer Polymer

The crosslinkable elastomer composition includes at least one elastomer polymer, especially an ethylenically unsaturated elastomer polymer, which may be, for example, an unsaturated rubber or a diene polymer or copolymer. Nonlimiting examples of suitable monomers that may be used in preparing such elastomers include 1,3-butadiene, isoprene, 1,3-pentadiene (piperylene), 2,3-dimethyl-1,3-butadiene, 1-phenyl-1,3-butadiene, 1,3-hexadiene, dicyclopentadiene, ethylidene norborene, and vinyl norborene. Nonlimiting examples of suitable co-monomers that may be used with these include ethylene, propylene, and aromatic vinyl compounds like styrene.

Nonlimiting examples of suitable unsaturated rubbers include natural rubbers (NR), synthetic rubbers, and mixtures of natural rubbers and synthetic rubbers such as balata, gutta-percha, acrylate-butadiene rubber (ABR), bromo-isobutylene-isoprene rubber (BIIR), butadiene rubber (BR), chloro-isoprene-isoprene rubber (CIIR), chloroprene rubber (CR), ethylene-propylene-diene rubber (EPDM), ethylene-propylene rubber (EPM), guayule rubber (GR), isobutylene-isoprene rubber (IIR), polyisobutylene rubber (IM), synthetic isoprene rubber (IR), acrylonitrile-butadiene rubber (NBR), acrylonitrile-chloroprene rubber (NCR), acrylonitrile-isoprene rubber (NIR), vinylpyridine-styrene-butadiene rubber (PSBR), styrene-butadiene rubber (SBR), styrene-chloroprene rubber (SCR), styrene-butadiene-styrene block copolymers (SBS), styrene-ethylene-butadiene-styrene block copolymers (SEBS), styrene-isoprene rubber (SIR), styrene-isoprene-styrene (SIS), vinylpyridine-butadiene rubber (VPBR), carboxylic-acrylonitrile-butadiene rubber (XNBR). These, as well as any other diene-containing elastomers, may be used in any combination.

In various embodiments it may be advantageous for the elastomer to be or include a natural rubber, polybutadiene, polyisoprene, or copolymer such as ethylene-propylene-diene copolymer (EPDM), styrene-butadiene block copolymers, styrene-isoprene block copolymers, styrene-butadiene rubbers (SBR), acrylonitrile-butadiene-styrene rubbers (ABS). In particular, for making dynamically crosslinked thermoplastic materials for golf ball the elastomer may be or include a polybutadiene rubber. The polybutadiene rubber may have any combination of 1,4-cis-, 1,4-trans-, and vinyl structures or content, such as having a 1,4-trans- content greater than a 1,4-cis-content or a 1,2-vinyl content; having a 1,4-cis- content greater than a 1,4-trans- content or a 1,2-vinyl content; or having a 1,2-vinyl content greater than a 1,4-cis-content or a 1,4-trans- content. The unsaturated rubber may be a high 1,4-cis-polybutadiene rubber having at least about 60%, preferably at least about 70%, more preferably at least about 75%, still more preferably at least about 80%, yet more preferably at least about 90%, and most preferably at least about 95% 1,4-cis content. In another non-limiting embodiment, the unsaturated rubber may be a low 1,4-cis-polybutadiene rubber having at most about 50% 1,4-cis content or at most about 40% 1,4-cis content. In other non-limiting embodiments, it may be preferred to use a high 1,4-trans-polybutadiene rubber having at least about 60%, preferably at least about 70%, such as 75% or 80%, more preferably at least about 90%, and most preferably at least about 95%, 1,4-trans content. The unsaturated rubber may also be a low 1,4-trans-polybutadiene rubber having less than about 40% 1,4-trans content or may be a high 1,2-vinyl polybutadiene rubber having at least about 40%, such as 50% or 60%, and preferably at least about 70%, 1,2-vinyl content. In another non-limiting embodiment, the unsaturated rubber may be a low 1,2-vinyl polybutadiene rubber having at most about 30%, preferably at most about 20%, and more preferably at most about 15%, such as about 10%, about 5%, or about 2%, 1,2-vinyl content.

Combinations of more than one elastomer may be selected to provide desirable physical, chemical, or performance characteristics of an article formed from the dynamically crosslinked material.

B. Monomer

Figure 2:
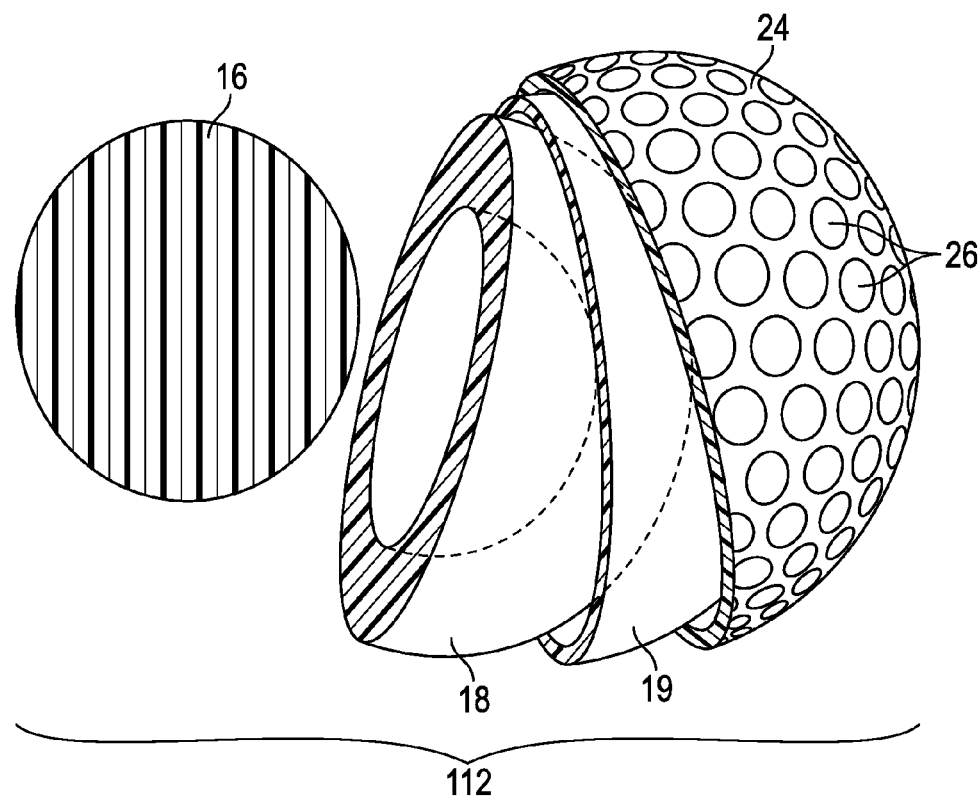
FIG. 2 is a schematic, enlarged, partial cross-sectional view of the golf ball.

In some embodiments particularly useful for forming a component of a golf ball, such as golf ball 112 shown in FIG. 2, the elastomer composition may also include an ethylenically-unsaturated monomer such as an unsaturated carboxylic acid or a metal salt of an unsaturated carboxylic acid. The ethylenically-unsaturated monomer may contribute to crosslinking of the elastomer polymer. The elastomer composition may include an ethylenically-unsaturated monomer having more than one polymerizable ethylenically unsaturated group covalently linked or ionically linked, for example through a metal cation in the metal salt of an unsaturated carboxylic acid.

Suitable unsaturated carboxylic acids or metal salts of unsaturated carboxylic acids may have one or more ethylenic unsaturations. Nonlimiting examples are $\alpha,\beta$-ethylenically unsaturated acids or anhydrides having 3 to 30 carbon atoms, such as acrylic acid, methacrylic acid, crotonic acid, maleic acid, fumaric acid, oleic acid, linoleic acid, erucic acid, and maleic anhydride.

Suitable metal salts of the unsaturated carboxylic acid may include Group I alkali metal salts, Group II alkaline earth metal salts, transition metal salts, or more specifically, magnesium salts, zinc salts, calcium salts, cobalt salts, iron salts, titanium salts, nickel salts, manganese salts, aluminum salts, sodium salts, and copper salts. Specific examples of metal salts of the unsaturated carboxylic acids that may be used include zinc diacrylate, magnesium diacrylate, calcium diacrylate, zinc dimethacrylate, magnesium dimethacrylate, calcium dimethacrylate, zinc dioleate, magnesium dioleate, calcium dioleate, zinc erucicate, magnesium erucicate, calcium erucicate, zinc maleate, magnesium maleate, calcium maleate, and combinations of these. In some embodiments, zinc diacrylate or zinc dimethacrylate is preferred.

The elastomer composition may include the unsaturated carboxylic acid or the metal salt of the unsaturated carboxylic acid in an amount of more than zero up to about 80 parts by weight based on 100 parts by weight of the elastomer. In various embodiments, the elastomer composition includes from about 10 to about 70 parts by weight or from about 15 to about 60 parts by weight or from about 15 parts by weight to about 40 parts by weight of the unsaturated carboxylic acid or the metal salt of the unsaturated carboxylic acid C. First Free Radical Initiator and Second Free Radical Initiator The elastomer composition includes a first free radical initiator and a second free radical initiator. The elastomer composition may also include more than one first free radical initiator or more than one second free radical initiator. The first free radical initiator primarily or exclusively initiates partial crosslinking of the elastomer compound at a first crosslinking temperature, and the second free radical initiator primarily or exclusively initiates further crosslinking at a second crosslinking temperature.

In a first relationship between the first and second free radical initiators, the first free radical initiator may have a half-life of from about 0.2 minutes to about 5 minutes at the first crosslinking temperature, and the second free radical initiator may have a half-life of from about 0.2 minutes to about 5 minutes at the second crosslinking temperature, with the second crosslinking temperature being higher than the first crosslinking temperature by at least about 30° C. In some non-limiting embodiments, the first free radical initiator may have a half-life at the first crosslinking temperature of from about 0.5 minutes to about 4 minutes or from about 1 minute to about 3 minutes. In these or other embodiments, the second free radical initiator may have a half-life at the second crosslinking temperature of from about 0.5 minutes to about 4 minutes or from about 1 minute to about 3 minutes. Further, the second crosslinking temperature may be higher than the first crosslinking temperature by at least about 35° C. or at least about 45° C. or at least about 50° C. or at least about 55° C. or at least about 60° C. or at least about 65° C. or at least about 70° C. In various embodiments, the second crosslinking temperature may be higher than the first crosslinking temperature by from about 30° C. or about 35° C. or about 40° C. to about 90° C. or to about 95° C. or to about 100° C., or preferably from about 40° C. to about 90° C. or from about 40° C. to about 85° C. or from about 45° C. to about 85° C. or from about 40° C. to about 80° C. or from about 45° C. to about 80° C. or from about 45° C. to about 75° C. or from about 50° C. to about 90° C. or from about 50° C. to about 85° C. or from about 50° C. to about 80° C. or from about 50° C. to about 75° C.

Instead of or in addition to the initiator half-lives at the respective crosslinking temperatures and the difference between the first and second crosslinking temperatures just described, there may be a second relationship between the first and second initiators such that the first free radical initiator has a one-minute half-life temperature that is at least about 30° C. lower than the second free radical initiator's one-minute half-life temperature, and in various embodiments the first free radical initiator's one-minute half-life temperature can be at least about 35° C. lower, or at least about 40° C. lower, or at least about 45° C. lower, or at least about 50° C. lower, or at least about 55° C. lower, or at least about 60° C. lower, or at least about 65° C. lower, or at least about 70° C. lower, or at least about 75° C. lower, or at least about 80° C. lower than the second free radical initiator's one-minute half-life temperature. In these embodiments, the first crosslinking temperature may be from about 20° C. lower to about 20° C. higher than the first one-minute half-life temperature and the second crosslinking temperature may be from about 20° C. lower to about 20° C. higher than the second one-minute half-life temperature. In example embodiments, the first crosslinking temperature may be from about 10° C. lower to about 10° C. higher than the first one-minute half-life temperature or from about 5° C. lower to about 5° C. higher than the first one-minute half-life temperature, and the second crosslinking temperature may independently be from about 10° C. lower to about 10° C. higher than the second one-minute half-life temperature or from about 5° C. lower to about 5° C. higher than the second one-minute half-life temperature. In particular embodiments of the second relationship between the first and second initiators, the first initiator's one-minute half-life temperature may be from about 120° C. to about 170° C., preferably from about 130° C. to about 155° C., or from about 135° C. to about 150° C., or from about 145° C. to about 160° C., while, the second initiator's one-minute half-life temperature may be from about 185° C. to about 260° C., preferably from about 190° C. to about 250° C., or from about 200° C. to about 250° C., or from about 210° C. to about 250° C., or from about 200° C. to about 230° C.

The first and second initiators are preferably selected so that the first crosslinking temperature may be from about 100° C. to about 190 C. For example, the first crosslinking temperature may be from about 110° C. to about 190° C., or from about 110° C. to about 180° C., or from about 120° C. to about 180° C., or from about 130° C. to about 180° C., or from about 130° C. to about 170° C., or from about 150° C. to about 170° C. It should be noted that the heat of the first crosslinking reaction may cause the temperature to rise from the nominal first crosslinking temperature to which the elastomer compound is heated. The temperature during the first crosslinking step may be allowed to increase, but should remain at least about 30° C. lower than the second crosslinking temperature. Similarly, the first and second initiators are preferably selected so that the second crosslinking temperature may be from about 160° C. to about 280° C. For example, the second crosslinking temperature may be from about 170° C. to about 270° C., or from about 180° C. to about 260° C., or from about 190° C. to about 250° C., or from about 200° C. to about 240° C., or from about 210° C. to about 240° C.

The first free radical initiator and the second free radical initiator may each be organic peroxides or azo compounds. Suitable organic peroxides may include, but are not limited to, dialkyl organic peroxides, diacyl organic peroxides, peroxyketal organic peroxides, peroxyester organic peroxides, peroxydicarbonates, and peroxymonocarbonates. Particular examples of suitable organic peroxides include, but are not limited to, di-t-amyl peroxide; di-t-butyl peroxide; t-butyl cumyl peroxide; di-cumyl peroxide; di(2-methyl-1-phenyl-2-propyl) peroxide; t-butyl 2-methyl-1-phenyl-2-propyl peroxide; di(t-butylperoxy)-diisopropylbenzene; benzoyl peroxide; 1,1-di(t-butoxy)-3,3,5-trimethyl cyclohexane; 3,3,5,7,7-pentamethyl-1,2,4-trioxepane; cumyl hydroperoxide; t-butyl hydroperoxide; 2,5-dimethyl-2,5-di(t-butylperoxy) hexane; 2,5-dimethyl-2,5-di(t-butylperoxy)hexyne; 2,5-dimethyl-2,5-di(benzoylperoxy)hexane; 2,2'-bis(t-butylperoxy)-di-iso-propylbenzene; n-butyl 4,4-bis(t-buytl-peroxy)valerate; t-butyl perbenzoate; benzoyl peroxide; n-butyl 4,4'-bis (butylperoxy) valerate; t-amyl perbenzoate; α,α-bis(t-butylperoxy)diisopropylbenzene; and combinations thereof. Suitable azo compounds may include, but are not limited to, azobisisobutyronitrile (AIBN); 1,1'-azobis(cyclohexanecarbonitrile) (ABCN); 2,2'-azodi(2-methylbutyronitrile) (AMBN); 2,2'-azobis[2-(2-imidazolin-2-yl)propane]dihydrochloride; 2,2'-azobis[2-(2-imidazolin-2-yl)propane]disulfate dehydrate; 2,2'-azobis(2-methylpropionamidine)dihydrochloride; 2,2'-azobis[N-(2-carboxyethyl)-2-methylpropionamidine]hydrate; 2,2'-azobis{2-[1-(2-hydroxyethyl)-2-imidazolin-2-yl]propane}dihydrochloride; 2,2'-azobis[2-(2-imidazolin-2-yl)propane]; 2,2'-azobis(1-imino-1-pyrrolidino-2-ethylpropane)dihydrochloride; 2,2'-azobis{2-methyl-N-[1,1-bis(hydroxymethyl)-2-hydroxyethl]propionamide}; 2,2'-azobis[2-methyl-N-(2-hydroxyethyl)propionamide]; and combinations thereof.

In one non-limiting embodiment, the first free radical initiator may be a first organic peroxide or a first azo compound, and the second free radical initiator may be a second organic peroxide or a second azo compound that is different from the first organic peroxide or the first azo compound, respectively. The first free radical initiator and the second free radical initiator are different from one another. For example, the first free radical initiator may be dibenzoyl peroxide or 1,1-bis(t-butylperoxy)-3,3,5-trimethylcyclohexane, and the second free radical initiator may be di-t-butyl peroxide, cumyl hydroperoxide, t-butyl hydroperoxide, or 3,3,5,7,7-pentamethyl-1,2,4-trioxepane.

The first free radical initiator and the second free radical initiator may be present in the elastomer composition in combination in an amount of from about 0.1 part by weight to about 20 parts by weight based on 100 parts by weight of the elastomer. For example, the first free radical initiator and the second free radical initiator may be present in combination in the elastomer composition in an amount of from about 0.1 to about 15 parts by weight or from about 0.5 to about 10 parts by weight, based on 100 parts by weight of the ethylenically unsaturated elastomer.

The weight ratio of the first free radical initiator to the second free radical initiator may be from about 2:98 to about 40:60, preferably from about 5:95 to about 40:60, and most preferably from about 10:90 to about 30:70.

The first free radical initiator may be present in the elastomer composition in an amount of up to about 40 parts by weight based on 100 parts by weight of a total amount of the first free radical initiator and the second free radical initiator in combination. For example, the first free radical initiator may be present in the elastomer compound in an amount of from about 2 parts by weight to about 40 parts by weight based on 100 parts by weight of the total amount of the first free radical initiator and the second free radical initiator. In various embodiments, the first free radical initiator may be present in the elastomer compound in an amount of from about 5 parts by weight to about 40 parts by weight, or from about 2 parts by weight to about 35 parts by weight, or from about 5 parts by weight to about 35 parts by weight, or from about 8 parts by weight to about 35 parts by weight, or from about 10 parts by weight to about 30 parts by weight, or from about 5 parts by weight to about 25 parts by weight, or from about 8 parts by weight to about 25 parts by weight, based on 100 parts by weight of the total amount of the first free radical initiator and the second free radical initiator. In another example, the first free radical initiator may be present in the elastomer compound in an amount of from about 5 parts by weight to about 20 parts by weight based on 100 parts by weight of the total amount of the first free radical initiator and the second free radical initiator.

It is possible to include more than two initiators, for example a third initiator may be used to initiate partial crosslinking of the elastomer composition at a lower temperature than that of the first free radical initiator or a third free radical initiator may be used for curing at the final stage of curing the elastomer.

D. Additives

The elastomer composition may include one or more additives such as, but not limited to, processing agents, antioxidants, ultraviolet stabilizers, fillers, pigments, silane coupling agents, plasticizers, rheology modifiers (such as nanoparticles having comparatively high aspect ratios, nano-clays, nano-carbon, graphite, nano-silica, and the like), and combinations of additives.

The elastomer composition may include a filler, suitable examples of which include, but not limited to, clay, talc, asbestos, graphite, glass, mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), particulate synthetic plastics (such as high molecular weight polyethylene, polypropylene, polystyrene, polyethylene ionomeric resins, polyamide, polyester, polyurethane, polyimide, and the like), particulate carbonaceous materials (such as carbon black and the like), as well as cotton flock, cellulose flock, cellulose pulp, leather fiber, and combinations of any of the above. Non-limiting examples of heavy-weight filler components that may be used to increase the specific gravity of the cured elastomer composition may include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that may be used to decrease the specific gravity of the elastomer compound may include particulate plastics, hollow glass spheres, ceramics, and hollow spheres, regrinds, and foams, which may be used in combinations. Such fillers may be used, for example, in golf balls to affect the weight or moment of inertia of the golf ball. For example, with reference to FIG. 2, any of the center 16 or intermediate layers 18, 19 forming the core of golf ball 112 may be made from the present dynamically crosslinked thermoplastic materials in which the rubber domains include one or more fillers selected to provide a certain weight or weight distribution to the golf ball 112.

Typical levels of these and other fillers include from about 10 phr to 100 phr or higher (where "phr" indicates parts by weight based on 100 parts of the elastomer). In various embodiments, the compositions may contain 10-80, 30-70, 40-60, or 50-60 phr filler. In various embodiments, the compositions comprise a silica filler. Typical levels of silica filler include from about 10 phr to 100 phr or higher. In various embodiments, the compositions contain 10-80, 30-70, 10-60, 40-60, 50-60, or 35-60 phr filler.

The elastomer composition may include any of a wide variety of black, white, or colored pigments.

Particularly in the case of a rubber elastomer, the elastomer may optionally be compounded with a process oil to facilitate both compounding and processing. Process oils may come from petroleum sources, i.e. oils derived from plant or animal sources. The petroleum process oils may be hydrotreated to remove at least a large portion of the aromatic compounds. Petroleum-based oils can be selected from the group consisting of paraffinic oils, naphthenic oils, and aromatic oils. The non-petroleum-based oils may contain a sufficient level and distribution of fatty acid side chains to partially incorporate into the rubber composition at low levels or to act as internal plasticizers at higher levels. The oils derived from plant or animal sources can be classified by their iodine number. Plant- and animal-derived oils may contain double bonds, and each double bond can react with one iodine molecule. The iodine number, defined as the number of grams of iodine taken up by 100 grams of oil, gives a rough measure of the number of double bonds in an oil. The oil may have an iodine number of greater than 50 and, preferably, greater than 60. During crosslinking the double bonds are available for reaction with the unsaturated elastomer molecules. In another aspect, these oils are triglycerides of one or more unsaturated fatty acids. Such a plant- or animal-derived oil is capable of effectively crosslinking an unsaturated elastomer during crosslinking if the oil molecule contains a double bond on two or more of the three fatty acid side chains in an oil molecule. Preferred oils may have at least 50% of the fatty acid side chains with one or more sites of unsaturation. In this way, the unsaturated oils can facilitate processing of the rubber during the compounding phase and can be incorporated into the rubber network during the curing phase to enhance the physical properties of the rubber composition and prevent blooming.

In some embodiments the elastomer composition contains less than 5 phr (parts by weight per hundred parts of elastomer) of the process oil, preferably less than or equal to 3 phr. The rubber elastomer composition may contain from about 0.1 to about 5 phr of vegetable oil. In other embodiments, the elastomer compounds contain a maximum of 3 phr vegetable oil, or less than 3 phr. In other embodiments, the elastomer compounds may contain from 0.1 to 2 phr vegetable oil. Non-limiting examples of vegetable oils include peanut oil, sunflower oil, cottonseed oil, linseed oil, soybean oil, rapeseed oil, sesame oil, safflower oil, poppy seed oil, tung oil, wheat oil, olive oil, palm oil, coconut oil, corn oil, palm-kernel oil, castor oil, cocoa butter, cocoa oil, and mixtures thereof. Castor oil has unique chemistry in that it is the only source of an 18 carbon hydroxylated fatty acid with one double bond (12-hydroxyoleic acid or ricinoleic acid). This fatty acid consistently comprises about 90% of castor oil. The presence of hydroxyl groups provides this oil with advantages, especially in predominantly saturated rubbers such as butyl (IIR) and halogenated butyl rubbers (BIIR, CIIR). Castor oil can also be used in more polar rubber compounds such as halogenated rubbers. This is especially advantageous, since traditional petroleum oils have limited solubility in these types of rubbers.

The elastomer, first free radical initiator, second free radical initiator, optional unsaturated carboxylic acid or metal salt of the unsaturated carboxylic acid, and optional additives may be compounded together to form the elastomer composition. For example, the components may be mixed together in a continuous mixer or a batch mixer, e.g., an intermeshing rotor mixer, such as an Intermix mixer, a twin screw extruder, or a tangential rotor mixer such as a Banbury mixer, or a two roll mill. The mixer may blend the components together via a single step or multiple steps, and may mix the components via dispersive mixing or distributive mixing to form the resulting elastomer composition. Partially crosslinking the elastomer composition before introducing the thermoplastic polymer composition prevents or diminishes transfer of lower molecular components of the elastomer composition into the thermoplastic polymer composition.

Partially Crosslinking

Referring again to FIG. 1, the elastomer composition is partially cured at the first crosslinking temperature in a first area 122 of the extruder before the thermoplastic polymer composition is added. In a batch process, the elastomer compound is partially cured at the first crosslinking temperature during a first period of time of the batch process before the thermoplastic polymer composition is added to the reactor.

The elastomer composition may be heated at about the first crosslinking temperature for from about 0.5 to about 15 minutes. In various embodiments, the elastomer composition may be partially crosslinked at the first crosslinking temperature for from about 0.5 minute or from at least about 1 minute or from at least about 2 minutes or from at least about 3 minutes or at least about 4 minutes or at least about 5 minutes to at most about 15 minutes or at most about 13 minutes or at most about 10 minutes, or at most about 7 minutes, or at most about 6 minutes. In other examples, the elastomer composition may be partially crosslinked at the first crosslinking temperature for from about 0.5 minute or for at least about 1 minute or at least about 2 minutes to at most about 3 minutes. In other embodiments, the elastomer composition may be partially crosslinked at the first crosslinking temperature for from about 0.5 to about 5 minutes or from about 0.5 to about 3 minutes.

The partial crosslinking leaves the elastomer composition thermoplastic so as to allow mixing or kneading with the thermoplastic polymer composition. The partially crosslinked elastomer compound has a first crosslinking density. The term "crosslinking density" refers to an average number of chain segments between crosslinks per unit volume of the elastomer. The fully cured elastomer has a final crosslinking density. In particular, partially crosslinking may include curing the elastomer compound so that the first crosslinking density is at most about 40% of the final crosslinking density. The first crosslinking density of the partially cured elastomer compound may be from about 1% or about 2% or about 5% or about 10% or from about 20% to about 30% or to about 40% of the final crosslinking density or from about 20% to about 30% of the final crosslinking density. For example, the crosslinking density of the precursor compound after partially crosslinking may be from about 1% to about 40%, or from about 2% to about 40%, or from about 2% to about 30%, or from about 5% to about 30%, or from about 5% to about 20%, or from about 10% to about 30%, or from about 20% to about 30% of the final crosslinking density. That is, the elastomer compound is partially crosslinked at the first crosslinking temperature to a first crosslinking density that is at most about 40% of the first crosslinking density. In other examples, the first crosslinking density of the precursor compound after partially crosslinking 20 may be from about 1% to about 20%, or from about 2% to about 20%, or from about 2% to about 10%, or from about 5% to about 20%, or from about 5% to about 10% of the final crosslinking density.

Thermoplastic Polymer Composition

At a desired point of partial crosslinking, the thermoplastic polymer composition is added to and mixed with the partially crosslinked elastomer compound. The thermoplastic polymer composition may be added in solid form (e.g., as flakes, chips, or pellets) or liquid form (i.e., heated to above the $T_g$ or $T_m$ of the thermoplastic polymer). When the thermoplastic polymer composition is added in solid form, in mixing with the partially crosslinked elastomer compound temperature is above, or increased to be above, the melting point or glass transition temperature of the thermoplastic polymer or polymers in the thermoplastic polymer composition. The mixture of the partially crosslinked elastomer compound and the thermoplastic polymer composition is heated to the second crosslinking temperature. The step of heating to the second crosslinking temperature may take place concurrently with melting of a solid thermoplastic polymer composition, begin after the solid thermoplastic polymer composition is partially melted, or being after solid thermoplastic polymer composition is fully melted.

The thermoplastic polymer composition includes at least one thermoplastic polymer and may optionally other components such as colorants, pigments, fillers, plasticizers, antioxidants, ultraviolet stabilizers, rheology modifiers (such as nano-particles having comparatively high aspect ratios, nano-clays, nano-carbon, graphite, nano-silica, and the like), and combinations of additives, including any of the examples of these additives already described.

Nonlimiting examples of thermoplastic polymers that may be used include polyolefin polymers and copolymers, polyester resins such as polyethylene terephthalate (PET) and polybutylene terephthalate (PBT), polyamides, polyolefin elastomers (metallocene-catalyzed block copolymers of ethylene and α-olefins having 4 to about 8 carbon atoms), metal cation ionomers of addition copolymers ("ionomer resins"), fatty acid modified ionomers, highly neutralized polymers, copolymers of ethylene and vinyl acetate (EVA), copolymers of ethylene and alkyl (meth)acrylate, thermoplastic polyamide elastomers (PEBA or polyether block polyamides), thermoplastic polyester elastomers, thermoplastic styrene block copolymer elastomers such as poly(styrene-butadiene-styrene), poly(styrene-ethylene-co-butylene-styrene), and poly(styrene-isoprene-styrene) (which will not be compounded with curing agents such that they will remain thermoplastic in the dynamically crosslinking thermoplastic product), thermoplastic polyurethane elastomers, and thermoplastic polyurea elastomers.

Suitable, nonlimiting examples of polyamides include Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6, Nylon 6T, Nylon 6/6T copolymer, Nylon 66/PP copolymer, and Nylon 66/PPS copolymer.

Suitable, nonlimiting examples of polyesters include polybutylene terephthalate (PBT), polyethylene terephthalate (PET), polyethylene isophthalate (PEI), PET/PEI copolymer, polyarylate (PAR), polybutylene naphthalate (PBN), liquid crystal polyesters, polybutylene terephthalate/tetraethylene glycol copolymer, and polyoxyalkylenediimide diacid/polybutylene terephthalate copolymer.

Suitable, nonlimiting examples of polyolefin polymers and copolymers include polyethylene, polypropylene, ethylene-ethyl acrylate copolymers, ethylene-vinyl acetate copolymers, ethylene-methacrylate copolymers, ionomer resins, chlorinated polyethylene, and polystyrene.

Ionomer resins are metal cation ionomers of addition copolymers of ethylenically unsaturated acids. Preferred ionomers are copolymers of at least one alpha olefin, at least one $C_{3-8}$ α,β-ethylenically unsaturated carboxylic acid, and optionally other comonomers. The copolymers may contain as a comonomer at least one softening monomer such as an ethylenically unsaturated ester, for example vinyl acetate or an alkyl acrylate or methacrylate such as a $C_1$ to $C_8$ alkyl acrylate or methacrylate ester.

The weight percentage of acid monomer units in the ionomer copolymer may be in a range having a lower limit of about 1 or about 4 or about 6 or about 8 or about 10 or about 12 or about 15 or about 20 weight percent and an upper limit of about 20 (when the lower limit is not 20) or about 25 or about 30 or about 35 or about 40 weight percent based on the total weight of the acid copolymer. The α,β-ethylenically unsaturated acid is preferably selected from acrylic acid, methacrylic acid, ethacrylic acid, maleic acid, crotonic acid, fumaric acid, itaconic acid, and combinations of these. In various embodiments, acrylic acid and methacrylic acid may be particularly preferred.

The acid monomer is preferably copolymerized with an alpha-olefin selected from ethylene and propylene. The weight percentage of alpha-olefin units in the ionomer copolymer may be at least about 15 or about 20 or about 25 or about 30 or about 40 or about 50 or about 60 weight based on the total weight of the acid copolymer.

In certain preferred embodiments, the ionomer includes no other comonomer besides the alpha-olefin and the ethylenically unsaturated carboxylic acid. In other embodiments, a softening comonomer is copolymerized. Nonlimiting examples of suitable softening comonomers are alkyl esters of $C_{3-8}$ α,β-ethylenically unsaturated carboxylic acids, particularly those in which the alkyl group has 1 to 8 carbon atoms, for instance methyl methacrylate, ethyl acrylate, ethyl methacrylate, propyl acrylate, propyl methacrylate, butyl acrylate, butyl methacrylate, isobutyl acrylate, tert-butyl methacrylate, hexyl acrylate, 2-ethylhexyl methacrylate, and combinations of these. When the ionomer includes a softening comonomer, the softening comonomer monomer units may be present in a weight percentage of the copolymer in a range with a lower limit of a finite amount more than zero), or about 1 or about 3 or about 5 or about 11 or about 15 or about 20 weight percent of the copolymer and an upper limit of about 23 or about 25 or about 30 or about 35 or about 50 weight percent of the copolymer.

Nonlimiting specific examples of acid-containing ethylene copolymers include copolymers of ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/(meth)acrylic acid/hexyl (meth)acrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include copolymers of ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate. In various embodiments the most preferred acid-containing ethylene copolymers include ethylene/(meth)acrylic acid/n-butyl acrylate, ethylene/(meth)acrylic acid/ethyl acrylate, and ethylene/(meth)acrylic acid/methyl acrylate copolymers. The term "(meth)acrylate" is used to mean methacrylate or acrylate; the term "(meth)acrylic" is used to mean acrylic or methacrylic.

The acid moiety in the ethylene acid copolymer is neutralized by any metal cation. Suitable cations include lithium, sodium, potassium, magnesium, calcium, barium, lead, tin, zinc, aluminum, bismuth, chromium, cobalt, copper, strontium, titanium, tungsten, or a combination of these cations; in various embodiments alkali, alkaline earth, or zinc metal cations are preferred.

In various preferred embodiments, the ionomer resin is formed by adding a sufficiently high molecular weight, monomeric, mono-functional organic acid or salt of organic acid to the acid copolymer or ionomer so that the acid copolymer or ionomer can be neutralized, without losing processability, to a level above the level that would cause the ionomer alone to become non-melt-processable. The monomeric, mono-functional organic acid its salt may be added to the ethylene-unsaturated acid copolymers before they are neutralized or after they are optionally partially neutralized to a level between about 1 and about 100%, provided that the level of neutralization is such that the resulting ionomer remains melt-processable. In generally, when the monomeric, mono-functional organic acid is included the acid groups of the copolymer may be neutralized from at least about 40 to about 100%, preferably at least about 80% to about 100%, more preferably at least about 90% to about 100%, still more preferably at least about 95% to about 100%, and most preferably about 100% without losing processability. Such high neutralization, particularly to levels of at least about 80% or at least about 90% or at least about 95% or most preferably 100%, without loss of processability can be done by (a) melt-blending the ethylene α,β-ethylenically unsaturated carboxylic acid copolymer or a melt-processable salt of the copolymer with the organic acid or the salt of the organic acid, and (b) adding a sufficient amount of a cation source up to 110% of the amount needed to neutralize the total acid in the copolymer or ionomer and organic acid or salt to the desired level to increase the level of neutralization of all the acid moieties in the mixture preferably at least about 80%, at least about 90%, at least about 95%, or preferably to about 100%. To obtain 100% neutralization, it is preferred to add a slight excess of up to 110% of cation source over the amount stoichiometrically required to obtain the 100% neutralization.

The preferred monomeric, monofunctional organic acids are aliphatic or aromatic saturated or unsaturated acids that may have from 6 or about 8 or about 12 or about 18 carbon atoms to about 36 carbon atoms or less than 36 carbon atoms. Nonlimiting suitable examples of the monomeric, monofunctional organic acid includes caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives of these, and their salts, particularly the barium, lithium, sodium, zinc, bismuth, chromium, cobalt, copper, potassium, strontium, titanium, tungsten, magnesium or calcium salts. These may be used in any combination.

Many grades of ionomer resins are commercially available, for example from E.I. du Pont de Nemours and Company, Inc. under the trademark Surlyn® or the designation "HPF," from ExxonMobil Chemical under the trademarks Iotek™ and Escor™, or from Honeywell International Inc. under the trademark AClyn®. The various grades and types may be used in combination. Suitable ionomer resins are also disclosed in U.S. Pat. Nos. 5,179,168, 5,580,927, 6,100,321; 6,777,472; 6,653,383; 6,815,480; 6,953,820; and 7,375,151, all assigned to DuPont, all of which are incorporated herein by reference.

Other thermoplastic elastomers that may be used in making the dynamically crosslinked thermoplastic material include polyolefin elastomers. Thermoplastic polyolefin elastomers are metallocene-catalyzed block copolymers of ethylene and α-olefins having 4 to about 8 carbon atoms that are prepared by single-site metallocene catalysis, for example in a high pressure process in the presence of a catalyst system comprising a cyclopentadienyl-transition metal compound and an alumoxane. Nonlimiting examples of the α-olefin softening comonomer include hexene-1 or octene-1; octene-1 is a preferred comonomer to use. These materials are commercially available, for example, from ExxonMobil under the tradename Exact™ and from the Dow Chemical Company under the tradename Engage™.

Suitable thermoplastic styrene block copolymer elastomers that may be used in the thermoplastic polymer composition include poly(styrene-butadiene-styrene), poly(styrene-ethylene-co-butylene-styrene), poly(styrene-isoprene-styrene), poly(styrene-b-butadiene) di-block polymer, poly(styrene-ethylene-co-butylene) di-block polymer, and poly(styrene-ethylene-co-propylene) copolymers. These styrenic block copolymers may be prepared by living anionic polymerization with sequential addition of styrene and the diene forming the soft block, for example using butyl lithium as initiator. Thermoplastic styrene block copolymer elastomers are commercially available, for example, under the trademark Kraton™ sold by Kraton Polymers U.S. LLC, Houston, Tex. Other such elastomers may be made as block copolymers by using other polymerizable, hard, non-rubber monomers in place of the styrene, including meth(acrylate) esters such as methyl methacrylate and cyclohexyl methacrylate, and other vinyl arylenes, such as alkyl styrenes.

Thermoplastic polyurethane elastomers such as thermoplastic polyester-polyurethanes, polyether-polyurethanes, and polycarbonate-polyurethanes may be used in the thermoplastic polymer composition. The thermoplastic polyurethane elastomers include polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

The polyester diols used in forming a thermoplastic polyurethane elastomer are in general prepared by the condensation polymerization of one or more polyacid compounds and one or more polyol compounds. A polymeric polyether or polycaprolactone diol reactant for preparing thermoplastic polyurethane elastomers may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. In one preferred embodiment, the lactone is ε-caprolactone. In other embodiments, a diol initiator may be reacted with an oxirane-containing compound to produce a polyether diol to be used in the polyurethane elastomer polymerization. The oxirane-containing compound is preferably selected from ethylene oxide, propylene oxide, butylene oxide, tetrahydrofuran, and combinations of these. Polytetrahydrofuran, also known as polytetramethylene ether glycol (PTMEG), is one preferred polymeric polyol for use in making the thermoplastic polyurethane elastomer. Aliphatic polycarbonate diols that may be used in making a thermoplastic polyurethane elastomer may be prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Aromatic polycarbonates are usually prepared from reaction of bisphenols, e.g., bisphenol A, with phosgene or diphenyl carbonate.

Suitable thermoplastic polyurea elastomers may be prepared by reaction of one or more polymeric diamines or polyols with one or more of the polyisocyanates and one or more diamine extenders. Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Specific examples of suitable polyamide block copolymers include NYLON 6, NYLON 66, NYLON 610, NYLON 11, NYLON 12, copolymerized NYLON MXD6, and NYLON 46 block copolymer elastomers.

Thermoplastic polyester elastomers have blocks of monomer units with low chain length that form the crystalline regions and blocks of softening segments with monomer units having relatively higher chain lengths. Thermoplastic polyester elastomers are commercially available under the trademark Hytrel® from DuPont and under the trademark Pebax® from Arkema.

The thermoplastic polymer composition may include a combination of thermoplastic polymers and may include any of the additives already mentioned, such as pigments, fillers, dispersants, antioxidants, processing aids, surfactants, stabilizers, and so on.

Further Crosslinking

After adding the thermoplastic polymer composition, the mixing is continued at the second crosslinking temperature that is higher than the first crosslinking temperature, as described above, while being mixed with the thermoplastic polymer composition to form cured, dispersed elastomer domains in a continuous matrix of the thermoplastic polymer composition.

Further crosslinking may be carried out at the second crosslinking temperature for a period of time such as from about 1 minute to about 30 minutes. For example, the elastomer composition may be further crosslinked at the second crosslinking temperature for from about 1 to about 30 minutes, or from about 3 to about 30 minutes, or from at least about 3 minutes to about 25 minutes, or from at least about 3 minutes to about 20 minutes, or from about 5 to about 30 minutes, or from at least about 5 minutes to about 25 minutes, or from at least about 5 minutes to about 20 minutes, or from about 7 to about 30 minutes, or from at least about 7 minutes to about 25 minutes, or from at least about 7 minutes to about 20 minutes, or from about 10 to about 30 minutes, or from at least about 10 minutes to about 25 minutes, or from at least about 10 minutes to about 20 minutes. The elastomer compound is crosslinked to a final crosslink density.

After further crosslinking, the resulting domains of cured elastomer are thermoset but dispersed in a thermoplastic matrix. As such the product may be further molded or shaped in any desired form or article.

Starting with a Thermoplastic, Partially-Crosslinked Elastomer Composition

In another process, a thermoplastic, partially-crosslinked elastomer composition is provided and combined with a thermoplastic polymer composition, then the two are mixed at a temperature at which the elastomer composition is further crosslinked to form domains of crosslinked or cured elastomer composition in a matrix of the thermoplastic polymer composition. In this process, the thermoplastic, partially-crosslinked elastomer composition may be added to the reactor first, the thermoplastic polymer composition may be added to the reactor first, or thermoplastic, partially-crosslinked elastomer composition and the thermoplastic polymer composition may be added a the same time or at substantially the same time. The thermoplastic, partially-crosslinked elastomer and the thermoplastic polymer composition may each independently be added as a liquid (heated as needed to liquefy) or as a solid. If one or both of the thermoplastic, partially-crosslinked elastomer composition and the thermoplastic polymer composition is solid when added, the solid material is heated with mixing until melted. The thermoplastic, partially-crosslinked elastomer includes the second free radical initiator, and the mixture of the thermoplastic, partially-crosslinked elastomer and the thermoplastic polymer composition is heated to the second crosslinking temperature and mixed to cause the mixture to form a dynamically crosslinked product of the thermoplastic polymer composition containing a dispersed phase of crosslinked elastomer composition.

The thermoplastic, partially-crosslinked elastomer composition may be made by as described already through partial crosslinking at the first crosslinking temperature. Then, the thermoplastic, partially-crosslinked elastomer composition is cooled to a solid and may be comminuted, with or without first adding a thermoplastic polymer composition. On being cooled the partially-crosslinked elastomer composition comprises at least some amount of a free radical initiator capable of further crosslinking the elastomer when the thermoplastic, partially-crosslinked elastomer composition is heated to with the thermoplastic polymer composition to a crosslinking temperature.

However made, the thermoplastic, partially-crosslinked elastomer composition is introduced into the reactor before, with, or after the thermoplastic polymer composition. The two materials are mixed and heated to a crosslinking temperature at which they are liquid and which initiator in the elastomer composition causes further crosslinking of the elastomer composition to form the dynamically crosslinked thermoplastic polymer product having a dispersed phase of crosslinked elastomer in the thermoplastic polymer composition. The crosslinking of the thermoplastic, partially-crosslinked elastomer composition to a final crosslink density in the presence of the thermoplastic polymer composition may be carried out at the second crosslinking temperatures and second crosslinking times as described above to provide the dynamically crosslinked thermoplastic product.

Articles Prepared from the Dynamically Crosslinked Thermoplastic Product

The materials made by the disclosed process may be used in any applications where thermoplastic materials and dynamically vulcanized or dynamically crosslinked thermoplastic materials are useful. Flexibility, durability, and other properties may be matched to those required in a specific application by proper selection of thermosetting elastomer composition and thermoplastic polymer composition and their relative amounts used in making the dynamically crosslinked material. The disclosed process advantageously prevents or retards transfer of low molecular weight components between the thermosetting elastomer composition phase and thermoplastic polymer composition phase.

The materials made by the disclosed process may be used to make many different kinds of articles, nonlimiting examples including seals, such as seals for windows and doors, including for architectural or automotive applications and other seals, such as for engines, motors, and appliances; gaskets; tubing and hoses; air ducts; automotive bumpers; and "soft-touch" surfaces; grips, including grips on golf clubs, tennis rackets, baseball bats, lacrosse and hockey sticks, bicycles, ski poles, and other sporting equipment, hand tools, power tools, kitchen implements, and medical instruments; golf balls and other balls; footwear, including athletic footwear, such as for outsoles, insoles, cushioning components, and traction elements; diving equipment, including wet suits; tires, wheels, and rollers; cable covers; bellows; drive belts, gloves, covers, for example for cell phones; and floor coverings, including treads for stairs; bumpers; gaskets; bags; cable covers; tubing and hose; o-rings; weatherstrips; and other applications where elastomers and dynamic vulcanizates are used.

Golf Balls

In one non-limiting example, the dynamically crosslinked product may be used to make a core or a core component, e.g., a center 16 or one or more intermediate layers 18, 19, or a cover 24 of a golf ball 112 shown in FIG. 2. FIG. 2 schematically illustrates an exploded, partial cross-sectional view of a golf ball 112. As shown, the golf ball 112 may have a multi-layer construction that includes a core with a center 12 surrounded by one or more intermediate layers 18, 19, and a cover 24 (i.e., where the cover 24 surrounds the core and forms an outermost layer of golf ball 112). While FIG. 2 generally illustrates a ball 112 with a four-piece construction, the presently described structure and techniques may be equally applicable to three-piece balls, as well as balls with five or more pieces. In general, the cover 24 may define an outermost layer of the ball 112 and may include any desired number of dimples 26, including, for example, between 280 and 432 total dimples, and in some examples, between 300 and 392 total dimples, and typically between 298 to 360 total dimples. As known in the art, the inclusion of dimples generally decreases the aerodynamic drag of the ball, which may provide for greater flight distances when the ball is properly struck.

In a completely assembled ball 112, each layer (including the center 16, cover 24, and one or more intermediate layers 18, 19) may be substantially concentric with every other layer such that every layer shares a common geometric center. Additionally, the mass distribution of each layer may be uniform such that the center of mass for each layer, and the ball as a whole, is coincident with the geometric center.

In particular embodiments, at least one of the center 16, intermediate layers 18,19, and cover 24 is made from the dynamically crosslinked thermoplastic material made as described above. Preferably, the dynamically crosslinked thermoplastic material has domains of a crosslinked rubber compound and a matrix of an ionomer resin. The crosslinked rubber compound may preferably be prepared from a compound including a polybutadiene rubber, especially a high 1,4-cis-polybutadiene rubber having at least about 60%, preferably at least about 80%, more preferably at least about 90%, and most preferably at least about 95%, 1,4-cis content. The crosslinked rubber compound may preferably be prepared from a compound including a metal salt of an unsaturated carboxylic acid as described above. In these and other preferred embodiments, the thermoplastic polymer composition of the matrix includes an ionomer resin is formed by adding a monomeric, mono-functional organic acid or salt of organic acid having from 6 or about 8 or about 12 or about 18 carbon atoms to about 36 carbon atoms or less than 36 carbon atoms to the acid copolymer or ionomer and preferably neutralizing the acid groups of the copolymer at least about 90% to about 100%, still more preferably at least about 95% to about 100%, and most preferably about 100%.

It is preferred for the dynamically crosslinked thermoplastic material having the rubber domains and the mono-functional organic acid-modified ionomer to have at least about 30 weight percent, preferably at least about 40 weight percent, more preferably at least about 50 weight percent or at least about 60 weight percent or at least about 70 weight percent or at least about 80 weight percent or at least about 90 weight percent of the thermoplastic mono-functional organic acid-modified ionomer-containing composition based on the total weight of the dynamically crosslinked thermoplastic material.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for making a dynamically crosslinked thermoplastic material, comprising:
 (a) partially crosslinking an elastomer composition at a first crosslinking temperature to form a thermoplastic, partially crosslinked elastomer composition;
 (b) mixing a thermoplastic polymer composition with the thermoplastic, partially crosslinked elastomer composition and heating the mixture to a second crosslinking temperature higher than the first crosslinking temperature, wherein the thermoplastic polymer composition is liquid at the second crosslinking temperature; and
 (c) continuously mixing the mixture while further crosslinking the elastomer composition to form a thermoplastic material having a dispersed phase of crosslinked elastomer composition in the thermoplastic polymer composition.

2. A method according to claim 1, wherein the elastomer composition comprises an elastomer, a first free radical initiator, and a second free radical initiator.

3. A method according to claim 2, wherein the one-minute half-life of the first free radical initiator is at least about 30° C. lower than the one-minute half-life of the second free radical initiator.

4. A method according to claim 3, wherein the first crosslinking temperature is from about 20° C. lower than the one-minute half-life of the first free radical initiator to about 20° C. higher than the one-minute half-life of the first free radical initiator and wherein the second crosslinking temperature is from about 20° C. lower than the one-minute half-life of the second free radical initiator to about 20° C. higher than the one-minute half-life of the second free radical initiator.

5. A method according to claim 2, wherein the first free radical initiator has a half-life of from about 0.2 minute to about 5 minutes at the first crosslinking temperature and wherein the second free radical initiator has a half-life of from about 0.2 minute to about 5 minutes at the second crosslinking temperature.

6. A method according to claim 1, wherein the second crosslinking temperature is at least about 30° C. higher than the first crosslinking temperature.

7. A method according to claim 1, wherein one of the elastomer composition or the thermoplastic polymer composition comprises a non-polymer component.

8. A method according to claim 1, wherein the method is carried out as a batch process.

9. A method according to claim 1, wherein the method is carried out as a continuous process.

10. A method according to claim 1, wherein the elastomer composition comprises a rubber polymer.

11. A method according to claim 10, wherein the elastomer composition comprises an ethylenically-unsaturated carboxylic acid or a metal salt of an unsaturated carboxylic acid.

12. A method according to claim 10, wherein the rubber polymer comprises polybutadiene.

13. A method according to claim 1, wherein the elastomer composition or the thermoplastic polymer composition comprises a filler or an additive.

14. A method according to claim 1, wherein the thermoplastic polymer composition comprises a member selected from the group consisting of polyolefin polymers and copolymers, polyesters, polyamides, polyolefin elastomers, ionomer resins, copolymers of ethylene and vinyl acetate, copolymers of ethylene and (meth)acrylate, thermoplastic polyamide elastomers, thermoplastic polyester elastomers, thermoplastic styrene block copolymer elastomers, thermoplastic polyurethane elastomers, and thermoplastic polyurea elastomers.

15. A method according to claim 1, wherein the elastomer is crosslinked in step (a) to from about 5% to about 40% of its final crosslinking density in step (c).

16. A dynamically crosslinked thermoplastic material prepared according to the method of claim 1.

17. An article comprising the dynamically crosslinked thermoplastic material according to claim 16.

18. A method according to claim 2, wherein one of the elastomer composition or the thermoplastic polymer composition comprises a non-polymer component.

19. A method according to claim 11, wherein the rubber polymer comprises polybutadiene.

20. A dynamically crosslinked thermoplastic material prepared according to the method of claim 2.

* * * * *